No. 691,634. Patented Jan. 21, 1902.
L. JONES, Jr.
GEARING.
(Application filed Oct. 22, 1901.)
(No Model.) 2 Sheets—Sheet 1.
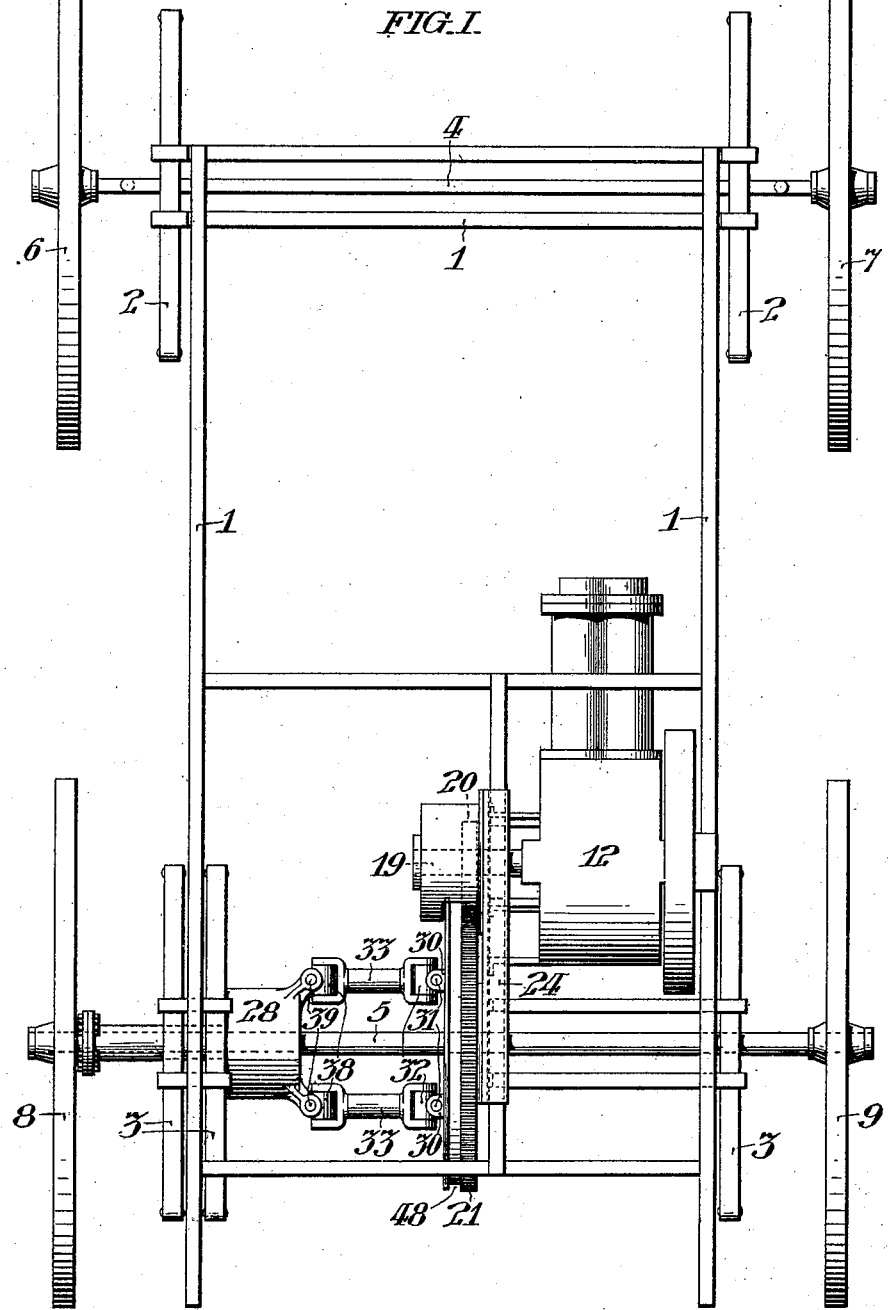
FIG. I.
WITNESSES: INVENTOR:
Clifton C. Hallowell LEWIS JONES JR.
Edward Rittenhouse No. 691,634. Patented Jan. 21, 1902.
L. JONES, Jr.
GEARING.
(Application filed Oct. 22, 1901.)
(No Model.) 2 Sheets—Sheet 2.
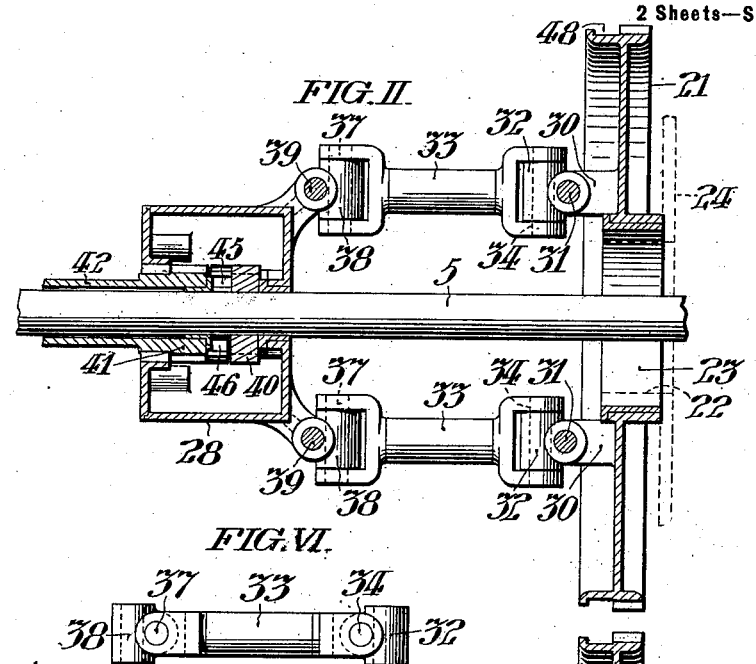
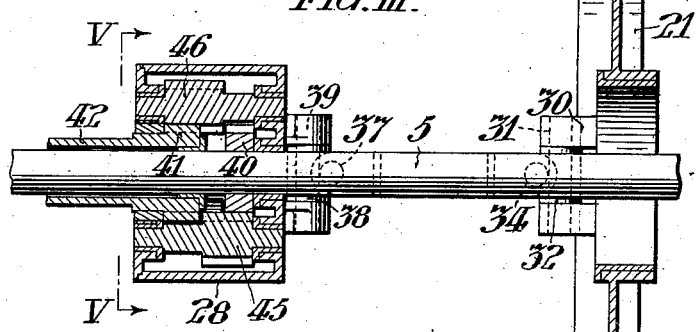
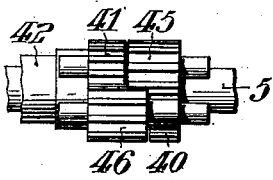
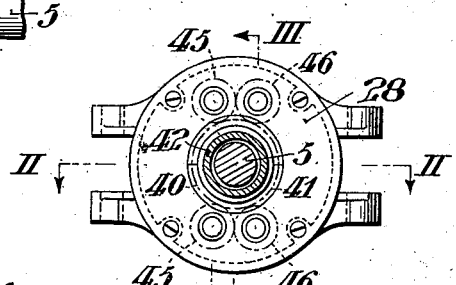
WITNESSES:
Clifton C. Hallowell
Edward Rittenhouse
INVENTOR:
LEWIS JONES JR,

UNITED STATES PATENT OFFICE.

LEWIS JONES, JR., OF PHILADELPHIA, PENNSYLVANIA.

GEARING.

SPECIFICATION forming part of Letters Patent No. 691,634, dated January 21, 1902.

Application filed October 22, 1901. Serial No. 79,492. (No model.)

*To all whom it may concern:*

Be it known that I, LEWIS JONES, Jr., of Philadelphia, in the State of Pennsylvania, have invented certain new and useful Improvements in Gearing, whereof the following is a specification, reference being had to the accompanying drawings.

It is the object of my invention to provide a device whereby rotary motion may be positively transmitted in either direction between a driving element and a driven element whose axes are normally parallel and concentric, but capable of relative gyration. Such a device may be advantageously employed in a self-propelled vehicle as a medium between the driving element of the motor and the driven element connected to the vehicle-supporting wheels when the motor is mounted upon the vehicle-body and the latter connected with its supporting-wheels by a resilient medium which permits of relative vertical movement of the vehicle-body and its wheels.

Generally stated, my invention comprises the combination, with a driving element and a driven element, of a resilient medium normally maintaining said elements with their axes parallel and concentric, but permitting relative gyration thereof, and a link pivotally connecting said two elements, whereby continuous rotary motion may be transmitted from one to the other irrespective of the relative gyration of their axes.

My invention also comprehends the various novel features of construction and arrangement hereinafter more definitely specified.

In the accompanying drawings, Figure I is a plan view of the running-gear of a self-propelled vehicle, showing a convenient embodiment of my invention. Fig. II is a plan sectional view of the driving and driven elements shown in Fig. I, taken on the line II II, indicated in Fig. V. Fig. III is a vertical sectional view of the parts shown in Fig. II, taken on the line III III, indicated in Fig. V. Fig. IV is a plan view showing the relation of the planetary gears indicated in Figs. II and III. Fig. V is a sectional view taken on the line V V in Fig. III. Fig. VI is a side elevation of one of the connecting-links shown in plan in Figs. I and II.

In said figures, 1 is the frame of the vehicle-body, which is connected by the springs 2 and 3 with the axles 4 and 5. The front axle 4 is provided with supporting-wheels 6 and 7, and the rear axle 5 is provided with the supporting-wheel 8, mounted to rotate independently thereof, and with the supporting-wheel 9, which is fixed to the axle. The motor 12 is fixedly mounted upon the vehicle-body 1, and by reason of the resilient medium between said body and its supporting-wheels said motor is permitted to rise and fall with respect to the axles 4 and 5, to which latter said motor is geared to transmit rotary motion, and thereby progress the vehicle, as follows: The shaft 19 of the motor 12 is provided with the pinion 20, engaged with the main driving-gear 21, and the latter is mounted to rotate upon the annular bearing 22, surrounding the opening 23 in the gear-frame 24, fixed to the frame of the motor 12. Said opening 23 is of such dimensions as to permit of such relative gyration of the axes of the driving-gear 21 and the axle 5 as is occasioned by the operation of the vehicle-springs during its traverse. However, the driving gear element 21 is connected with the driven gear element 28 so as to transmit rotary motion thereto irrespective of the relative position of said gear 21 and said axle 5, as follows: Said gear 21 is provided with bearing-lugs 30 and pins 31, which are entered through the universal joints 32, and said joints 32 are respectively connected with the links 33 by the pins 34. The opposite extremities of said links 33 are connected by the pins 37 with the universal joints 38, which are connected by the pins 39 with the driven element 28, and the relation of the parts above described is such that although the universal joints 32 and 38 permit the gear 21 to gyrate with respect to the shaft 5 said links positively transmit rotary motion from said gear 21 to said gear element 28 irrespective of their position of gyration.

If it is desired to merely transmit rotary motion from the gear 21 to the shaft 5, the driven element 28 may be rigidly secured to the latter. However, it being desired to so connect the vehicle-wheels 8 and 9 with the motor 12 as to permit of relative compensating movement of said wheels when one of them is caused to traverse a circle of greater radius than the other by divergence from a straight line of traverse, I constitute said gear element 28 a casing for other gear elements, which operatively connect it with the vehicle-supporting wheels 8 and 9, so that the latter may be rotated contemporaneously and independently, as follows: Said gear-casing 28 incloses the gear 40, fixed upon the shaft 5, which, as above described, is fixed to the vehicle-supporting wheel 9, and said gear-casing also incloses the gear 41, fixed upon the gear-sleeve 42. Said sleeve 42 is fixed upon the vehicle-supporting wheel 8 and therewith rotates upon the shaft 5 independently of the latter. Said shaft-gear 40 and sleeve-gear 41 are operatively connected with the gear-casing 28 by planetary gears 45 and 46, which are conveniently mounted in duplicate pairs in said casing 28, the members of each pair being alternately disposed in said casing in engagement with each other and in respective engagement with said gears 40 and 41, as best shown in Fig. IV. The described relation of the gears within said casing 28 is such that when both of the vehicle-wheels 8 and 9 encounter the same resistance, as when the vehicle is progressed in a straight path, both of said wheels are contemporaneously rotated by and with the gear-casing 28 without planetary progression of the gears 45 and 46. When, however, either of said vehicle-wheels is retarded by turning the vehicle to one side or the other, the gear fixed thereto within the casing 28 is of course retarded, and the continued rotation of said casing causes the planetary progression of the gears 45 and 46 with respect to the retarded gear, whereby the gear fixed to the unretarded wheel is rotated with the latter independently of the retarded gear and wheel, and thus progresses the vehicle in a curved path.

Although I find it convenient to employ compensating gearing of the form above described in association with the driving element 21 and driven element 28, operatively connected as above described, I do not desire to limit myself thereto.

It is to be understood that my invention may be associated with the other devices which are ordinarily employed in self-propelled vehicles. For instance, the driving element 21 is provided with a recessed flange 48, conveniently adapted to receive a brake-band. Moreover, although I have designated the element 21 as the "driving" element and the element 28 as the "driven" element, it is to be understood that the links connecting said elements serve to transmit rotary motion from one to the other with equal facility in either direction. It is also to be understood that I have used the term "sleeve" in a descriptive and not in a restrictive sense in referring to the element 42, as said element is made tubular in the described form of my invention merely as a matter of convenience.

I do not desire to limit myself to the precise construction and arrangement which I have shown, as it is obvious that various modifications may be made therein without departing from the essential features of my invention.

I claim—

1. In gearing of the class described, the combination with a driving element; of a driven element; a resilient medium connecting said elements in normally concentric relation, but permitting relative gyration of their axes; a link intermediate of said elements; and pivotal joints operatively connecting said elements by said link, whereby continuous rotary motion may be transmitted from one to the other irrespective of the relative gyration of their axes, substantially as set forth.

2. In gearing of the class described, the combination with a driving element; of a driven element; means operatively connecting said elements in normally concentric relation, whereby continuous rotary motion may be transmitted from one to the other, irrespective of the relative gyration of their axes; two gears in concentric relation with said driven element; and means operatively connecting said driven element with said two gears, whereby the latter may be rotated contemporaneously and independently, substantially as set forth.

3. In gearing of the class described, the combination with a driving element provided with a central opening; of a shaft extending through said opening, and arranged to gyrate therein; a driven element mounted upon said shaft in concentric relation therewith; a link intermediate of said driving and driven elements; and universal joints operatively connecting said elements by said link, whereby rotary motion may be transmitted from one to the other irrespective of the relative gyration of their axes, substantially as set forth.

4. In gearing of the class described, the combination with a driving-gear provided with a central opening; of a shaft extending through said opening and arranged to gyrate therein; a gear-casing mounted to rotate independently of said shaft in concentric relation therewith; means operatively connecting said driving-gear and said gear-casing, whereby continuous rotary motion may be transmitted from one to the other irrespective of the relative gyration of their axes; a sleeve mounted to rotate independently of said shaft in concentric relation therewith; two gears, respectively fixed to said shaft and to said sleeve, in concentric relation with said gear-casing; and, means operatively connecting said gear-casing with said two gears; whereby the latter may be rotated contemporaneously and independently, substantially as set forth.

5. In gearing of the class described, the combination with a driving-gear provided with a central opening; of a shaft extending through said opening and arranged to gyrate therein; a gear-casing mounted to rotate independently of said shaft in concentric relation therewith; means operatively connecting said driving-gear and said gear-casing, whereby continuous rotary motion may be transmitted from one to the other irrespective of the relative gyration of their axes; a sleeve mounted to rotate independently of said shaft in concentric relation therewith; two gears, respectively fixed to said shaft and to said sleeve, in concentric relation with said gear-casing; a planetary gear mounted in said gear-casing, in engagement with said shaft-gear; a second planetary gear mounted in said gear-casing, in engagement with the first planetary gear and with said sleeve-gear; whereby rotary motion may be transmitted contemporaneously and independently from said gear-casing to said shaft and said sleeve, substantially as set forth.

6. In gearing of the class described, the combination with a driving-gear provided with a central opening; of a shaft extending through said opening, and arranged to gyrate therein; a resilient medium connecting said driving-gear and shaft in normally concentric relation but permitting relative gyration of their axes; a gear-casing mounted to rotate independently of said shaft in concentric relation therewith; means operatively connecting said driving-gear and said gear-casing, whereby continuous rotary motion may be transmitted from one to the other irrespective of the relative gyration of their axes; a sleeve mounted to rotate independently of said shaft in concentric relation therewith; two gears respectively fixed to said shaft and to said sleeve in concentric relation with said gear-casing; and a pair of planetary gears, mounted in said gear-casing, in engagement with each other and in respective engagement with said shaft-gear and with said sleeve-gear, whereby said shaft and sleeve gears may be rotated contemporaneously and independently, substantially as set forth.

7. In gearing of the class described, the combination with a driving-gear provided with a central opening; of a shaft extending through said opening, and arranged to gyrate therein; a resilient medium connecting said driving-gear and shaft in normally concentric relation but permitting relative gyration of their axes; a gear-casing mounted to rotate independently of said shaft in concentric relation therewith; a link operatively connecting said driving-gear and said gear-casing by pivotal joints, whereby continuous rotary motion may be transmitted from one to the other irrespective of the relative gyration of their axes; a sleeve mounted to rotate independently of said shaft in concentric relation therewith; two gears respectively fixed to said shaft and to said sleeve in concentric relation with said gear-casing; and a pair of planetary gears, mounted in said gear-casing, in engagement with each other and in respective engagement with said shaft-gear and with said sleeve-gear, whereby said shaft and sleeve gears may be rotated contemporaneously and independently, substantially as set forth.

I testimony whereof I have hereunto signed my name, at Philadelphia, Pennsylvania, this 21st day of October, 1901.

LEWIS JONES, JR.

Witnesses:
ARTHUR E. PAIGE,
CLIFTON C. HALLOWELL.